G. MORE.
PORTAGE DEVICE.
APPLICATION FILED MAR. 3, 1922.
1,428,180.    Patented Sept. 5, 1922.
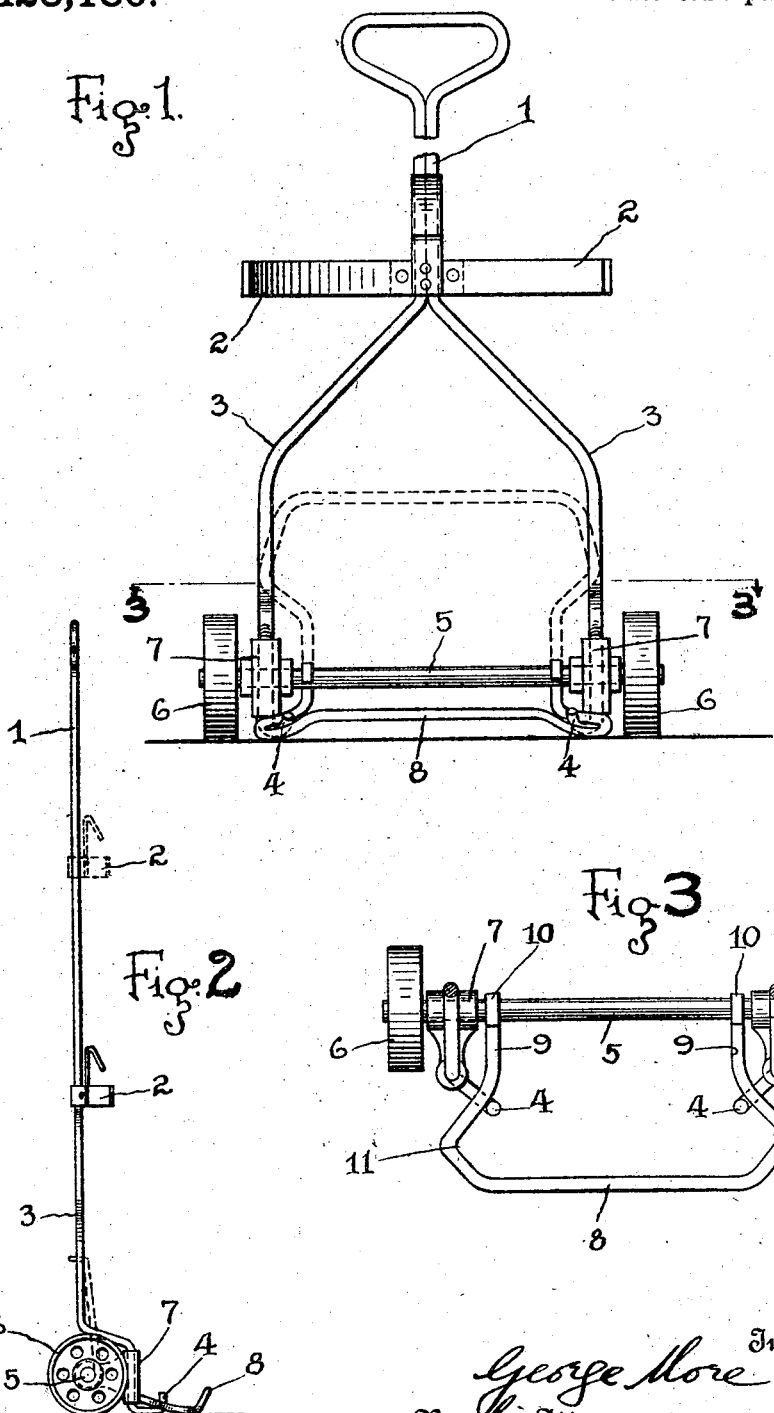
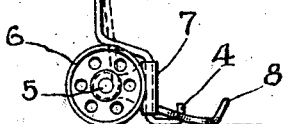
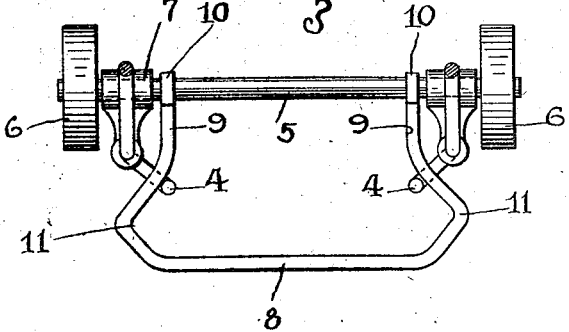
George More, Inventor Patented Sept. 5, 1922.

1,428,180

UNITED STATES PATENT OFFICE.

GEORGE MORE, OF BROOKLYN, NEW YORK, ASSIGNOR TO MORE HANDY TRUCK CORPORATION, OF BROOKLYN, NEW YORK, A CORPORATION OF NEW YORK.

PORTAGE DEVICE.

Application filed March 3, 1922. Serial No. 540,773.

*To all whom it may concern:*

Be it known that I, GEORGE MORE, a citizen of the United States, and resident of the borough of Brooklyn, county of Kings, and State of New York, have invented certain new and useful Improvements in Portage Devices, of which the following is a clear and exact specification, reference being had to the accompanying drawings, which form a part of this specification.

This invention relates to hand trucks or portage devices, and my present improvements are directed to certain novel features of construction and arrangements of parts, based upon the device forming the subject of my earlier Patents Nos. 1,155,081 and 1,380,073.

Said earlier patents cover a hand truck which is particularly intended for service in the portage of ash cans, barrels and the like, the truck being adapted to be drawn up flights of steps, when loaded, as well as for trundling on the surface.

In the development of the invention represented by the present improvement, I provide means which adapt the truck for service in the portage of trunks, boxes and other objects for which my previously patented invention was not suited, while retaining in the truck the original characteristic features for which it is noted, thereby enlarging its sphere of usefulness.

In my present improvement the form of the supporting means upon the truck for ash cans, barrels and the like is unchanged, but there is added a foldable foot portion or frame, which is pivoted to the axle for the traction wheels, to be capable of being swung forwardly into engagement with the said supporting means, this foot portion or frame thus comprising a support for a trunk, box or the like; or of being folded rearwardly against the truck frame to be out of the way, when the supporting means for ash cans, barrels and the like are to be employed.

Other features and advantages of my invention will hereinafter appear.

In the drawing:—

Figure 1 is a front elevation of a hand truck embodying my improvements, the handle portion being broken away.

Fig. 2 is a side elevation of Fig. 1 on a reduced scale, and

Fig. 3 is a plan view, being a horizontal section on the line 3—3 of Fig. 1.

In said figures the truck structure which has already been patented to me comprises the handle portion 1, which carries the slidable, article engaging member 2, the frame portion composed of the members 3, 3, that terminate, respectively, in the upturned, hook members 4, 4, to serve as supports for an ash can, barrel or the like; the axle 5, carrying the wheels 6, 6, and the fittings 7, 7, which respectively constitute engaging members for the axle, and engaging means for the frame members 3, 3.

The hook members 4, 4, which extend out forwardly of the device, are adapted to have contact with a supporting surface when the truck is in an upright position, and these members, being in advance of the wheels 6, 6, are thus capable of constituting, with the wheels, standards which permit the truck to maintain an upright position. Also, these hook members, which for example may be of rod like material, are angled inwardly from their respective fittings 7, 7, as thereby the base or article supporting portions of the hook members have approximately radial relation to the ash can, barrel or the like which they are to hold.

This angled arrangement of the hook members 4, 4, also fulfills another function in the development of my invention as will now appear.

Oscillably mounted on the axle 5 is a foot piece that is adapted to be either extended forwardly from or folded against the truck frame. This foot piece may be composed of rod material, having the forward portion 8, which is in parallelism with axle 5, and the side arms 9, 9, whose ends are shaped into socket like members 10, 10, that revolubly engage the axle, to thereby permit swinging movement to the foot piece.

The arms 9, 9 extend out from axle 5 at right angles thereto for a portion of their length, thence each having an outwardly angled formation 11, of approximate V-shape, wherefrom the arms respectively communicate with the portion 8, by elbow like formations 11, 11, that hold portion 8 in advance of the plane occupied by arms 9, 9.

On account of the particular structural form of the foot piece it is enabled with its straight arm portions 9, 9, to swing, within the compass of the fittings 7, 7, and with its angled portions 11, 11, to lie out upon the base portions of the hooks, 4, 4, which thereby hold the foot piece in operative position for supporting a trunk, box or the like.

It will be noted that the portion 8 of the foot piece, when the latter is extended for service, occupies a plane above the plane of the arms, and is therefore in a position where it is suited, as a rail, to comprise lodgment means for a trunk, box or the like that may be imposed upon the truck for portage purposes.

When the foot piece is required to be out of service, so that the truck may be adapted for its original purpose of hauling ash cans, barrels or the like requiring the use of hooks 4, 4, as the engaging means, then the foot piece is to be swung back against the truck frame, as shown in dotted lines, Figs. 1 and 2. In this position the angled portions 11, 11 of arms 9, 9 engage with the frame members 3, 3; which constitute a back stop therefor, the rail portion 8 of the foot piece, in this position, being protruded rearwardly through the frame, so that it will not prevent the foot piece from lying flat against the frame, which it should do to enable the device to be used for the portage of ash cans, barrels and the like, because if the foot piece, when folded back, projected forwardly of the frame, it would interfere with the coordinated function of the frame and hooks 4, 4 in seating an ash can, barrel or the like.

Variations within the spirit and scope of my invention are equally comprehended by the foregoing disclosure.

I claim:—

1. In a portage device having a frame, fittings carried thereby, a wheel axle engaging the fittings and provided with wheels, and means extended forwardly from the frame for supporting an ash can, barrel or the like, the combination of a foot-piece oscillably mounted on the axle, intermediate the fittings to swing forwardly into engagement with the supporting means for the purpose of supporting a trunk, box or the like, and to swing rearwardly against the frame when not in use.

2. In a portage device having a frame composed of rod-like material, fittings carried thereby, a wheel axle engaging the fittings and provided with wheels, and hook like members extended forwardly of the fittings to constitute a support for an ash can, barrel or the like, the combination of a foot-piece comprising a member whose ends are oscillably mounted upon the axle, said member having angled arms which carry a forward rail portion adapted to support a trunk, box or the like, the angled arms characterized by having portions adapted to engage the hook-like members when the foot-piece is swung forwardly for service, and by said portions serving to engage the frame when the foot-piece is swung rearwardly.

3. In a portage device having a frame composed of rod-like material, a wheel axle provided with wheels, a fitting member which respectively engages both the frame and axle, at opposite sides, the rod-like material of the frame extending forwardly from the fittings in the form of upturned, inwardly directed hooks, to constitute a support for an ash can, barrel or the like, the combination of a foot-piece comprising a member of rod-like material whose ends are oscillably mounted upon the axle intermediate the fittings, said member having angled arms which carry a forward rail portion adapted to support a trunk, box or the like, the angled arms characterized by having outward portions adapted to engage the hook like members when the foot-piece is swung forwardly for service, and said outward portions serving to engage the frame when the foot-piece is swung rearwardly.

Signed at the borough of Manhattan, city, county and State of New York, this 28th day of February, 1922.

GEORGE MORE. [L. S.]